(12) United States Patent
Bacallao et al.

(10) Patent No.: US 10,058,197 B2
(45) Date of Patent: Aug. 28, 2018

(54) BAG DISPENSER

(71) Applicant: Wal-Mart Stores, Inc., Bentonville, AR (US)

(72) Inventors: Yurgis Mauro Bacallao, Centerton, AR (US); Dennis Charles Beere, II, Centerton, AR (US); Tawfeek Abohammdan, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/653,768

(22) Filed: Jul. 19, 2017

(65) Prior Publication Data

US 2018/0027994 A1 Feb. 1, 2018

Related U.S. Application Data (60) Provisional application No. 62/366,877, filed on Jul. 26, 2016.

(51) Int. Cl.
*B42F 17/00* (2006.01)
*A47F 9/04* (2006.01)
(Continued)

(52) U.S. Cl.
CPC .......... *A47F 9/042* (2013.01); *B65B 67/1238* (2013.01); *B65B 67/1266* (2013.01);
(Continued)

(58) Field of Classification Search
CPC ...... B65H 75/28; B65H 75/446; B65H 16/04; B65H 18/026; B65H 5/28; B65D 7/20;
(Continued)

(56) References Cited

U.S. PATENT DOCUMENTS 259,932 A * 6/1882 Sims ............... A47J 43/287
248/213.2
370,563 A * 9/1887 Simmons ........... B42F 17/02
211/181.1

(Continued)

FOREIGN PATENT DOCUMENTS

AU 1142402 A1 4/2002
AU 2002364902 A1 5/2004
(Continued)

OTHER PUBLICATIONS

Search Report in UK Patent Application No. GB1621562.6, dated Jun. 14, 2017; 4 pages.
(Continued)

*Primary Examiner* — Abigail E Troy
*Assistant Examiner* — Devin K Barnett
(74) *Attorney, Agent, or Firm* — Schmeiser, Olsen & Watts LLP (57) ABSTRACT

A bag dispenser for use in a retail store is described. The bag dispenser holds and dispenses bags from a roll of plastic bags such as grocery bags, meat bags, or produce bags. The bag dispenser includes a bag holder rod that holds the roll of bags and allows the roll of bags to rotate on the bag holder rod in order to dispense bags. The bag dispenser also includes a bag separator that facilitates separation of a bag from the roll. The bag dispenser also includes a rod coupler that couples the bag dispenser to a rod, such as a rod of a shopping cart, a rod of a shopping cart basket or a rod of a pick-up basket, for example. The bag dispenser quickly and easily dispenses bags so that an employee of the retail store does not waste time and effort obtaining a bag.

7 Claims, 7 Drawing Sheets

(51) Int. Cl.
  *B65B 67/12* (2006.01)
  *B65H 5/28* (2006.01)
(52) U.S. Cl.
  CPC .......... *B65H 5/28* (2013.01); *A47F 2009/044* (2013.01); *B65B 2067/1272* (2013.01); *B65B 2067/1294* (2013.01)
(58) Field of Classification Search
  CPC ...... B65D 7/16; A47K 10/38; A47K 10/3836; A47F 9/042; A47F 2009/044; B65B 67/1266; B65B 67/1238; B65B 2067/1271; B65B 2067/1294
  USPC ....... 242/597, 597.8, 400, 402, 406; 248/95, 248/97, 100, 213.2, 302; 211/181.1, 113, 211/119, 12, 85.15; 220/482, 480, 494, 220/487, 486
  See application file for complete search history.

(56) References Cited

U.S. PATENT DOCUMENTS

| | | | | |
|---|---|---|---|---|
| 562,229 | A * | 6/1896 | Lenney | A47J 43/287 211/106 |
| 635,100 | A * | 10/1899 | Huebel | A47J 43/287 248/213.2 |
| 765,388 | A * | 7/1904 | Lanpher | B65F 1/1415 211/12 |
| 797,871 | A * | 8/1905 | Smith | B65D 11/1833 220/485 |
| 809,568 | A * | 1/1906 | Hurlburt | B65D 7/20 220/485 |
| 873,188 | A * | 12/1907 | Thumann | B65H 16/04 242/596.3 |
| 890,693 | A * | 6/1908 | McCoy | A47J 43/287 108/47 |
| 893,930 | A * | 7/1908 | Lederman | A47K 3/122 108/47 |
| 896,443 | A * | 8/1908 | Dyett | A47K 10/3836 118/43 |
| 936,736 | A * | 10/1909 | Porter | B65D 7/20 220/492 |
| 995,798 | A * | 6/1911 | McCullough | A23G 3/24 118/31 |
| 1,055,745 | A * | 3/1913 | Harrison | F16M 13/02 211/12 |
| 1,069,108 | A * | 8/1913 | Buhl | B65H 49/205 242/588.1 |
| 1,252,740 | A * | 1/1918 | Thornblade | B65D 7/20 220/491 |
| 1,284,579 | A * | 11/1918 | Brown | B65D 7/20 220/482 |
| 1,662,140 | A * | 3/1928 | Whitesides | A47K 10/3836 242/597.5 |
| 2,240,629 | A * | 5/1941 | Smith | A47K 10/3836 242/592 |
| 2,498,446 | A * | 2/1950 | Pawsat | B62J 9/003 224/421 |
| 2,563,679 | A * | 8/1951 | Hardy | B62J 1/165 224/415 |
| 2,603,438 | A * | 7/1952 | Adams | D06F 79/02 248/117.1 |
| 2,682,956 | A * | 7/1954 | Pike | A47F 5/0876 211/181.1 |
| 2,797,058 | A * | 6/1957 | Packham | D06F 95/002 248/201 |
| 3,133,660 | A * | 5/1964 | Roberts | B65D 7/14 198/465.4 |
| 3,266,742 | A * | 8/1966 | Pena | A47K 10/3836 242/560.3 |
| 3,313,504 | A * | 4/1967 | Stoltze | B65B 67/12 206/283 |
| 3,339,745 | A | 9/1967 | Sugerman | |
| D209,279 | S | 11/1967 | Cohen | |
| 3,438,644 | A * | 4/1969 | Kaplan | B62B 3/1428 220/480 |
| 3,475,067 | A * | 10/1969 | Girard | A47K 10/3836 242/560 |
| 3,747,298 | A * | 7/1973 | Lieberman | B65B 67/1266 248/100 |
| 3,930,696 | A * | 1/1976 | Hight | A47K 10/38 312/213 |
| 3,943,859 | A * | 3/1976 | Boone | A47K 10/32 108/27 |
| 3,995,803 | A * | 12/1976 | Uitz | B62J 7/06 224/417 |
| 4,048,754 | A * | 9/1977 | Laux | A01G 9/02 211/104 |
| 4,082,939 | A * | 4/1978 | Walters | A47J 31/005 211/106 |
| 4,106,617 | A * | 8/1978 | Boone | A47K 10/34 206/233 |
| 4,269,336 | A * | 5/1981 | Humlong | B62J 7/06 224/420 |
| 4,305,558 | A | 12/1981 | Baker | |
| 4,354,643 | A * | 10/1982 | Kenner | A47K 10/38 242/598.5 |
| 4,376,502 | A | 3/1983 | Cohen | |
| 4,403,807 | A | 9/1983 | Wilkinson et al. | |
| 4,456,125 | A * | 6/1984 | Chap | B65D 25/22 206/513 |
| 4,583,753 | A | 4/1986 | Economy | |
| 4,595,153 | A * | 6/1986 | Goetz | A47K 10/3836 242/594.3 |
| 4,655,409 | A * | 4/1987 | Zima | B41J 15/04 242/538.1 |
| 4,682,782 | A | 7/1987 | Mills | |
| 4,728,070 | A | 3/1988 | Engelbrecht | |
| 4,838,504 | A | 6/1989 | Bittenbinder | |
| D302,062 | S | 7/1989 | Sable | |
| 4,881,577 | A | 11/1989 | Stroh et al. | |
| 4,968,047 | A * | 11/1990 | Ferris | B62B 3/1408 248/302 |
| 4,974,799 | A | 12/1990 | Palmer | |
| 4,998,647 | A * | 3/1991 | Sharp | A47K 5/1214 211/113 |
| 4,998,694 | A | 3/1991 | Barteaux | |
| 5,190,253 | A * | 3/1993 | Sable | B65B 67/1205 248/97 |
| 5,362,077 | A | 11/1994 | Adamson | |
| 5,366,123 | A | 11/1994 | Range | |
| 5,385,318 | A * | 1/1995 | Rizzuto | A47K 10/3836 242/597.8 |
| 5,390,443 | A * | 2/1995 | Emalfarb | A47G 7/044 211/119 |
| 5,437,346 | A | 8/1995 | Dumont | |
| 5,443,173 | A * | 8/1995 | Emery | A47F 5/13 220/481 |
| D363,208 | S | 10/1995 | Seidel | |
| 5,460,279 | A * | 10/1995 | Emery | A47B 55/02 211/106 |
| 5,465,846 | A | 11/1995 | Blyth et al. | |
| 5,531,366 | A | 7/1996 | Strom | |
| 5,564,566 | A * | 10/1996 | Lamb | B25H 3/00 206/349 |
| 5,618,008 | A * | 4/1997 | Dearwester | A47K 10/32 242/594.5 |
| 5,704,497 | A * | 1/1998 | Wyatt | A47F 5/0031 211/163 |
| 5,727,721 | A * | 3/1998 | Guido | B26F 3/002 221/63 |
| D396,372 | S | 7/1998 | Goodman | |
| 5,836,486 | A | 11/1998 | Ohsugi | |
| 5,875,902 | A * | 3/1999 | Emery | A47B 96/16 108/29 |
| D412,080 | S | 7/1999 | Emery et al. | |
| 6,018,397 | A | 1/2000 | Cloutier et al. | |
| 6,041,945 | A | 3/2000 | Faraj | |
| 6,086,023 | A | 7/2000 | Kerr et al. | |

(56) References Cited

U.S. PATENT DOCUMENTS

| | | | |
|---|---|---|---|
| 6,109,462 A * | 8/2000 | Emalfarb | A47G 7/044 211/119 |
| 6,155,521 A | 12/2000 | O'hanlon | |
| 6,170,679 B1 * | 1/2001 | Frye | A47F 7/10 211/113 |
| 6,193,265 B1 | 2/2001 | Yemini | |
| 6,299,001 B1 * | 10/2001 | Frolov | A47F 5/01 211/106 |
| 6,305,572 B1 * | 10/2001 | Daniels | B65D 33/002 206/390 |
| D452,944 S * | 1/2002 | Schmidt | D34/6 |
| 6,341,704 B1 * | 1/2002 | Michel, Jr. | A47J 47/20 211/119 |
| 6,364,266 B1 | 4/2002 | Garvin | |
| 6,390,422 B2 | 5/2002 | Banko | |
| 6,409,031 B1 * | 6/2002 | Wynne | A47B 55/02 108/181 |
| D459,979 S | 7/2002 | Goodman | |
| 6,543,638 B2 | 4/2003 | Wile | |
| 6,561,403 B1 * | 5/2003 | Kannankeril | A47F 13/085 225/106 |
| 6,601,759 B2 | 8/2003 | Fife et al. | |
| 6,606,411 B1 | 8/2003 | Loui et al. | |
| 6,607,229 B1 | 8/2003 | McIntosh | |
| 6,648,265 B2 * | 11/2003 | Goldberg | A47K 10/38 242/422.5 |
| 6,655,537 B1 | 12/2003 | Lang et al. | |
| 6,685,075 B1 * | 2/2004 | Kannankeril | A47F 9/042 225/106 |
| 6,726,145 B1 * | 4/2004 | Kraus | A47K 10/3836 242/422.5 |
| 6,726,156 B1 | 4/2004 | Scola | |
| D490,691 S * | 6/2004 | Buss | D8/356 |
| 6,745,186 B1 | 6/2004 | Testa et al. | |
| 6,789,687 B2 | 9/2004 | Cramer | |
| 6,805,271 B2 * | 10/2004 | Holden | A47K 10/38 206/409 |
| 6,810,149 B1 | 10/2004 | Squilla et al. | |
| 6,832,739 B1 * | 12/2004 | Kraus | A47K 10/3836 242/422.5 |
| 6,886,101 B2 | 4/2005 | Glazer et al. | |
| 6,937,989 B2 | 8/2005 | Mcintyre et al. | |
| 7,066,389 B2 | 6/2006 | Dickover et al. | |
| 7,077,612 B1 | 7/2006 | Giggle, III et al. | |
| 7,128,251 B1 * | 10/2006 | Galle | A47F 9/042 225/2 |
| 7,172,092 B2 | 2/2007 | Yang et al. | |
| 7,177,820 B2 | 2/2007 | Mcintyre et al. | |
| 7,182,210 B2 * | 2/2007 | Metcalf | A47B 96/025 211/119 |
| 7,192,035 B1 | 3/2007 | Lioce | |
| D540,591 S * | 4/2007 | Snell | D6/523 |
| 7,222,363 B2 | 5/2007 | Rice et al. | |
| D552,901 S | 10/2007 | Wilfong, Jr. et al. | |
| D571,518 S | 6/2008 | Waldman | |
| D575,973 S | 9/2008 | Goodman et al. | |
| 7,431,208 B2 | 10/2008 | Feldman et al. | |
| 7,475,885 B2 | 1/2009 | Kovath | |
| 7,530,537 B2 | 5/2009 | Kandah | |
| 7,587,756 B2 | 9/2009 | Peart et al. | |
| 7,610,717 B2 | 11/2009 | Luken et al. | |
| 7,654,409 B2 | 2/2010 | Hoffman | |
| 7,716,064 B2 | 5/2010 | Mcintyre et al. | |
| D616,680 S | 6/2010 | Snider | |
| 7,850,014 B2 * | 12/2010 | Nguyen | A47F 9/042 211/12 |
| 7,887,068 B2 | 2/2011 | Ferguson | |
| 8,069,092 B2 | 11/2011 | Bryant | |
| D650,209 S * | 12/2011 | Snider | D6/513 |
| D654,737 S | 2/2012 | Guindi | |
| D666,858 S | 9/2012 | Goodman | |
| D667,250 S | 9/2012 | Goodman et al. | |
| 8,292,094 B2 * | 10/2012 | Morton | A47B 81/00 211/106 |
| 8,336,800 B1 * | 12/2012 | Lopez | B65H 75/4407 137/355.2 |
| D689,282 S | 9/2013 | Lindeman | |
| 8,572,712 B2 | 10/2013 | Rice et al. | |
| D693,577 S | 11/2013 | Goodman et al. | |
| 8,668,207 B1 | 3/2014 | Gilliam | |
| 8,746,640 B2 | 6/2014 | Broadley et al. | |
| 8,814,039 B2 | 8/2014 | Bishop et al. | |
| D713,663 S | 9/2014 | Pryor | |
| 8,820,633 B2 | 9/2014 | Bishop et al. | |
| 8,851,369 B2 | 10/2014 | Bishop et al. | |
| D718,054 S | 11/2014 | Goodman et al. | |
| D719,372 S | 12/2014 | Goodman et al. | |
| 8,905,411 B1 * | 12/2014 | Blanton | B62B 3/106 280/33.991 |
| D720,538 S | 1/2015 | Goodman et al. | |
| D728,255 S | 5/2015 | Guindi et al. | |
| 9,199,656 B1 | 12/2015 | Tong et al. | |
| D746,592 S | 1/2016 | Goodman et al. | |
| D747,876 S | 1/2016 | Goodman et al. | |
| D750,472 S | 3/2016 | Kuka | |
| D751,763 S * | 3/2016 | Goodman | D26/38 |
| D784,721 S * | 4/2017 | Goodman | D6/525 |
| 9,623,995 B2 * | 4/2017 | Tan | B65B 61/12 |
| D785,333 S | 5/2017 | Goodman et al. | |
| D785,369 S | 5/2017 | Goodman et al. | |
| D787,303 S | 5/2017 | Garvin | |
| 9,656,827 B2 * | 5/2017 | Sudhir | B65H 35/0026 |
| 9,737,141 B2 * | 8/2017 | Johnson | A47B 55/02 |
| D796,771 S * | 9/2017 | Bacallao | D34/27 |
| D803,032 S * | 11/2017 | Jammehdiabadi | D8/356 |
| 9,844,283 B2 | 12/2017 | Bacallao | |
| 2002/0145086 A1 | 10/2002 | Alvarado et al. | |
| 2002/0170937 A1 * | 11/2002 | Yeh | B65D 33/002 225/39 |
| 2002/0185510 A1 * | 12/2002 | Holsclaw | A47K 10/38 225/2 |
| 2002/0185513 A1 * | 12/2002 | Morris | B65H 35/10 225/96 |
| 2003/0000905 A1 * | 1/2003 | Zidek | A47F 5/01 211/205 |
| 2003/0042694 A1 | 3/2003 | Werner | |
| 2003/0052464 A1 | 3/2003 | McGuire | |
| 2003/0098326 A1 * | 5/2003 | Wile | A47F 9/042 225/77 |
| 2003/0121871 A1 * | 7/2003 | Zadro | A47K 3/281 211/119 |
| 2003/0198390 A1 | 10/2003 | Loui et al. | |
| 2004/0000529 A1 * | 1/2004 | Gladnick | B61B 12/002 211/113 |
| 2004/0000612 A1 * | 1/2004 | Young | A47K 10/3836 242/597.8 |
| 2004/0075015 A1 * | 4/2004 | Cain | A47K 10/38 242/595 |
| 2004/0124598 A1 | 7/2004 | Williams | |
| 2004/0139398 A1 | 7/2004 | Testa et al. | |
| 2004/0178298 A1 * | 9/2004 | Kennard | A47K 10/34 242/570 |
| 2004/0262385 A1 | 12/2004 | Blaeuer | |
| 2005/0056718 A1 * | 3/2005 | Kamenstein | A47K 10/3836 242/422.4 |
| 2005/0205578 A1 * | 9/2005 | Yeh | B62D 25/084 220/485 |
| 2005/0284729 A1 * | 12/2005 | LoRusso | B60R 11/00 198/301 |
| 2006/0097467 A1 | 5/2006 | Solomon et al. | |
| 2006/0124799 A1 * | 6/2006 | Johnson | B65H 49/32 242/594.3 |
| 2006/0226187 A1 | 10/2006 | Linker | |
| 2007/0095769 A1 * | 5/2007 | Jenkins | A47K 10/38 211/119.009 |
| 2007/0176058 A1 * | 8/2007 | Kohn | A47F 9/042 248/100 |
| 2007/0186515 A1 * | 8/2007 | Ruetten | A47F 13/085 53/502 |

(56) References Cited

U.S. PATENT DOCUMENTS

| | | | |
|---|---|---|---|
| 2007/0204044 A1 | 8/2007 | Rice et al. | |
| 2007/0261159 A1* | 11/2007 | Marks | A47K 10/38 |
| | | | 222/192 |
| 2007/0278359 A1 | 12/2007 | Kandah | |
| 2008/0000910 A1* | 1/2008 | Gaillard | A61B 50/10 |
| | | | 220/482 |
| 2008/0001019 A1* | 1/2008 | Brown | A47K 10/3836 |
| | | | 242/597.8 |
| 2008/0215448 A1 | 9/2008 | Boyle et al. | |
| 2008/0215449 A1 | 9/2008 | Boyle et al. | |
| 2008/0245684 A1* | 10/2008 | Yeatman | A47K 10/38 |
| | | | 206/233 |
| 2009/0078731 A1 | 3/2009 | Yi | |
| 2009/0078815 A1* | 3/2009 | Tong | A47K 10/38 |
| | | | 242/557 |
| 2009/0092342 A1 | 4/2009 | Rolim de Oliveira | |
| 2009/0184162 A1 | 7/2009 | Rice et al. | |
| 2009/0261050 A1* | 10/2009 | Curren | A47F 13/085 |
| | | | 211/85.15 |
| 2009/0319352 A1 | 12/2009 | Boyle et al. | |
| 2009/0327087 A1 | 12/2009 | Beck et al. | |
| 2010/0096514 A1 | 4/2010 | Adair et al. | |
| 2010/0102014 A1* | 4/2010 | Yang | A47K 3/281 |
| | | | 211/113 |
| 2010/0123050 A1 | 5/2010 | Astwood | |
| 2010/0148019 A1* | 6/2010 | Simhaee | B65B 67/1227 |
| | | | 248/97 |
| 2010/0219219 A1 | 9/2010 | Svetina | |
| 2010/0264101 A1* | 10/2010 | Ma | A47G 25/06 |
| | | | 211/85.15 |
| 2011/0266092 A1 | 11/2011 | Marquis et al. | |
| 2012/0125970 A1* | 5/2012 | Tsui | A47F 13/085 |
| | | | 225/106 |
| 2012/0167182 A1 | 6/2012 | Rice et al. | |
| 2012/0169020 A1 | 7/2012 | Farrell | |
| 2012/0305618 A1* | 12/2012 | Tan | B65H 35/10 |
| | | | 225/47 |
| 2012/0305619 A1* | 12/2012 | Tan | B26F 3/02 |
| | | | 225/106 |
| 2013/0026120 A1* | 1/2013 | Johnson | A47B 55/02 |
| | | | 211/85.5 |
| 2013/0037665 A1* | 2/2013 | Brasell | E04H 4/14 |
| | | | 248/205.6 |
| 2013/0092804 A1* | 4/2013 | Laitila | B65B 67/1227 |
| | | | 248/97 |
| 2013/0134181 A1* | 5/2013 | Helseth | B65H 16/005 |
| | | | 221/26 |
| 2013/0330163 A1* | 12/2013 | Marsh | A47F 13/085 |
| | | | 414/800 |
| 2014/0048576 A1* | 2/2014 | Tan | B65H 35/10 |
| | | | 225/51 |
| 2014/0131506 A1* | 5/2014 | Clarkin | A47K 1/09 |
| | | | 242/598.6 |
| 2014/0144966 A1* | 5/2014 | Tan | B26F 3/02 |
| | | | 225/47 |
| 2014/0209651 A1* | 7/2014 | Wilfong | A47F 13/085 |
| | | | 225/93 |
| 2014/0367507 A1* | 12/2014 | Trampolski | A47K 10/3687 |
| | | | 242/560.1 |
| 2016/0016752 A1* | 1/2016 | Helseth | B65H 16/005 |
| | | | 225/79 |
| 2016/0096542 A1* | 4/2016 | Fukushima | B62B 3/1468 |
| | | | 224/411 |
| 2016/0183744 A1* | 6/2016 | Sadikov | A47K 10/38 |
| | | | 118/249 |
| 2016/0227969 A1* | 8/2016 | Morris | A47K 10/22 |
| 2016/0242605 A1* | 8/2016 | Heymann | A47K 10/3836 |
| 2016/0270607 A1* | 9/2016 | Zeng | A47K 10/3836 |
| 2016/0300235 A1 | 10/2016 | Boyle et al. | |
| 2016/0367088 A1* | 12/2016 | Allard | A47K 10/36 |
| 2017/0066550 A1* | 3/2017 | Tsai | B65D 25/22 |
| 2017/0172322 A1* | 6/2017 | Bacallao | A47F 9/042 |
| 2017/0174243 A1 | 6/2017 | Bacallao et al. | |
| 2017/0197650 A1 | 7/2017 | Whistler | |
| 2017/0259959 A1* | 9/2017 | Nilsson | B65D 25/22 |
| 2017/0267412 A1* | 9/2017 | Krause | B65D 33/007 |
| 2017/0275126 A1* | 9/2017 | Sudhir | B65H 35/002 |
| 2017/0325603 A1 | 11/2017 | Bacallao | |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |
| DE | 29806330 U | 7/1998 |
| EP | 1182859 A2 | 2/2002 |
| EP | 1510944 A1 | 3/2005 |
| EP | 2387772 A1 | 11/2011 |
| EP | 2438562 A1 | 4/2012 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2007141417 A1 | 12/2007 |
| WO | 2010083113 | 7/2010 |
| WO | 2011008625 | 1/2011 |
| WO | 2013079878 A1 | 6/2013 |

OTHER PUBLICATIONS

Search Report in UK Patent Application No. GB1621564.2 dated Jun. 15, 2017; 5 pages.

Search Report in UK Patent Application No. GB1702839.0 dated Jun. 14, 2017; 5 pages.

"Universal Double Car Vehicle Hangers/Hooks Grocery Bags/Handbags/Umbrellas Organizer—Black," DealsMachine.com, accessed on Oct. 15, 2015; 2 pages.

"Over-the-Door Hook 3 Hook InterDesign," Target.com, accessed on Oct. 15, 2015; 4 pages.

JoshM "Smart Shopping Cart: Bagging Station Design," EECS398SmartShoppingCart.blogspot.in, Mar. 22, 2015; 2 pages.

"Clear Suspended Ceiling Hook," DoItBest.com, accessed on Oct. 14, 2015; 3 pages.

"Industrial T-shirt Bag Stand—Just like Grocery Stores," SmallBizWarehouse.com, accessed on Oct. 14, 2015; 4 pages.

"Dual L-Shape Flash Bracket Holder Mount for Canon Nikon Speedlikte DSLR Camera," Amazon.com, accessed on Janauary 5, 2016; 5 pages.

"InterDesign Classico Over-the-Door Tie and Belt Rack," HoldnStorage.com, accessed on Nov. 22, 2016; 2 pages.

"Small Matte 'So-Hooked' Rack," The Container Store, accessed on Nov. 22, 2016; 2 pages.

"POS Check Out Plastic Bag Holder Dispenser for Retail Supermarket Brand New!" Ebay.com, accessed on Nov. 17, 2016; 5 pages.

"Lot 2 Royston Plastic Grocery Bag Holder Dispenser Stand Point of Sale Shopping," TeraPeak.com, accessed on Nov. 17, 2016; 3 pages.

"Bag Holders," ULINE.mx, accessed on Nov. 17, 2016; 1 page.

"OEM Express Checkout Counter / Customized Supermarket Cash Register Stands Counters," Guangzhou ECO Commerical Equipment Co., Ltd, SupermarketCheckoutCounters.com, accessed on Nov. 17, 2016; 3 pages.

"Retrospec Bicycles Detachable Steel Half-Mesh Apollo Bike Basket with Handles," Retrospec Bicycles, Amazon.com, accessed on Apr. 27, 2017; 1 page.

"Transport trolley / waste / with waste bag holder / 1-bag WASTY 70 LT Francehopital," MedicalExpo.com, accessed on Apr. 25, 2017; 25 pages.

Jackie, "How to Make a Clothespin Bag," TheHappyHousewife.com, Apr. 19, 2012; 14 pages.

(56) References Cited

OTHER PUBLICATIONS

"Gluman Combo of 12 Sparkle Clothes Hangers (Yellow) and 6 Plastic Kitchen Storage Containers Blue (125 ml)," PAYtm.com, accessed on Apr. 24, 2017; 3 pages.
"Pack-N-Tote Reusable Grocery Cart Bag, Hooks Directly to the Shopping Cart, Black," Six Mour Creations, Amazon.com, accessed on Apr. 24, 2017; 5 pages.
"Toygully 12 Pack Solid Steel Finish Hangers with Clips strong," PAYtm.com, accessed on Apr. 26, 2017; 3 pages.
Search Report in United Kingdom Patent Application No. GB1621567.5, dated Jun. 14, 2017; 5 pages.
Notice of Allowance in U.S. Appl. No. 29/572,901, dated May 17, 2017; 9 pages.
"Actionclub Wall Mount Grocery Bag Dispenser Kitchen Plastic Recycle Storage Box Garbage Bag Orangizer Container Holder," AliExpress.com, accessed on Jun. 14, 2017; 3 pages.
"BG001-0111 : Bag Dispenser—Single," BowmanDispensers.com, accessed on Jun. 14, 2017; 8 pages.
"Axis Chrome Over Cabinet Plastic Bag Holder," OrganizeIt.com, accessed on Jun. 14, 2017; 2 pages.
"simplehuman Stainless Steel Grocery Bag Holder," ContainerStore.com, accessed on Jun. 14, 2017; 2 pages.
Search Report in GB Patent Application No. GB1713267.1, dated Dec. 22, 2017; 5 pages.
Search Report in GB Patent Application No. GB1713283.8, dated Dec. 22, 2017; 4 pages.
Non-Final Office Action in U.S. Appl. No 15/641,367, dated Jan. 12, 2018; 9 pages.
Non-Final Office Action in U.S. Appl. No. 15/703,307, dated Jan. 18, 2018; 9 pages.
Non-Final Office Action in U.S. Appl. No. 15/383,151, dated May 25, 2018; 13 pages.
Notice of Allowance in U.S. Appl. No. 15/703,307, dated May 23, 2018; 5 pages.
Non-Final Office Action in U.S. Appl. No. 15/383,126, dated May 16, 2018; 6 pages.
Notice of Allowance in U.S. Appl. No. 15/641,367, dated Jun. 7, 2018; 5 pages.

\* cited by examiner

FIG. 7

BAG DISPENSER

CROSS REFERENCE TO RELATED APPLICATION

This invention claims priority to U.S. provisional patent application Ser. No. 62/366,877, filed Jul. 26, 2016 to Applicant Wal-Mart Stores Inc., and entitled "Bag Dispenser", which is incorporated entirely herein by reference.

BACKGROUND OF THE INVENTION

Technical Field

This invention relates to fixtures for retail stores, and specifically to a bag dispenser for dispensing plastic bags from a roll. The bag dispenser clips to a rod of a basket such as a basket of a shopping cart or a shopping cart basket that affixes to a shopping cart.

State of the Art

Retail store employees often use plastic bags as they attend to tasks in the retail store. If a retail store employee cannot easily and quickly access a plastic bag for performing a task, time and effort is wasted in finding a plastic bag dispenser and removing a bag for use. Accordingly, it is desirable to have a bag dispenser that can be coupled to baskets often carried by employees, and that easily and quickly dispenses bags from a roll for use by the employee.

DETAILED DESCRIPTION OF EMBODIMENTS OF THE INVENTION

As discussed above, embodiments of the present invention relate to fixtures for retail stores, and specifically to a bag dispenser for dispensing a roll of bags, such as plastic produce bags or grocery bags. The bag dispenser clips to a rod of a basket. The bag dispenser can couple to many different types of baskets, such as a shopping cart basket or a basket that affixes to a shopping cart. The disclosed bag dispenser holds and dispenses a roll of plastic bags such as grocery bags, meat bags, or produce bags, for example. The bag dispenser includes a bag holder rod that holds the roll of bags and allows the roll of bags to rotate on the bag holder rod in order to dispense the bags. The bag dispenser also includes a bag separator coupled to the bag holder rod. The bag separator is used to facilitate separation of a bag from the roll. The bag dispenser also includes a rod coupler coupled to the bag holder rod. The rod coupler couples the bag dispenser to a basket rod—such as a rod of a shopping cart, a rod of a shopping cart basket or a rod of a pick-up basket, for example. The bag dispenser quickly and easily dispenses bags so that an employee does not waste time and effort finding a roll of bags and separating a bag from the roll.

Employees of retail stores often perform tasks where they use bags such as plastic grocery bags, meat bags, or produce bags, for example. The employee may be gathering items for an order placed by a customer, for example, and may need to put items in the bag. The employee may be collecting items in a store for transport, to another location, and needs a bag to put the items into. There are numerous tasks employees perform where they need ready access to plastic bags. If a retail store employee cannot easily and quickly access a plastic bag for performing a task, time and effort is wasted in finding a plastic bag dispenser and removing a bag for use. The disclosed bag dispenser is carried by the employee and easily and quickly dispenses bags from a roll for use by the employee. The bag dispenser couples to a rod of a basket because employees often carry a basket while performing tasks. The basket may be a shopping cart, a shopping cart basket, or other type of pick-up basket, for example. The bag dispenser includes clips that allow the bag dispenser to be coupled to many different locations on any number of basket types. The disclosed bag dispenser is lightweight and easy to use. Embodiments of the disclosed bag dispenser can be formed of rigid material such as plastic or metal (or plastic-coated metal) that does not break easily, and yet is flexible to allow the bag dispenser to be interlaced into the basket if desired. Once the bag dispenser is coupled to a basket, one or more rolls of plastic bags are installed on the bag dispenser. Individual bags can then be quickly and easily accessed and removed from the roll by the employee.

The disclosed bag dispenser includes a means to hold a roll of bags, and a means to couple the means to hold the roll of bags to a basket. In some embodiments, the means to couple the means to hold the roll of bags to a basket is a means to couple the means to hold the roll of bags to a rod. In some embodiments, the bag dispenser also includes a means to separate—or facilitate separation of—a bag from the roll of bags. In some embodiments, the means to hold a roll of bags is a means to hold more than one roll of bags. In some embodiments, the means to separate a bag from the roll of bags is coupled to the means to hold the bag.

Figure 1:
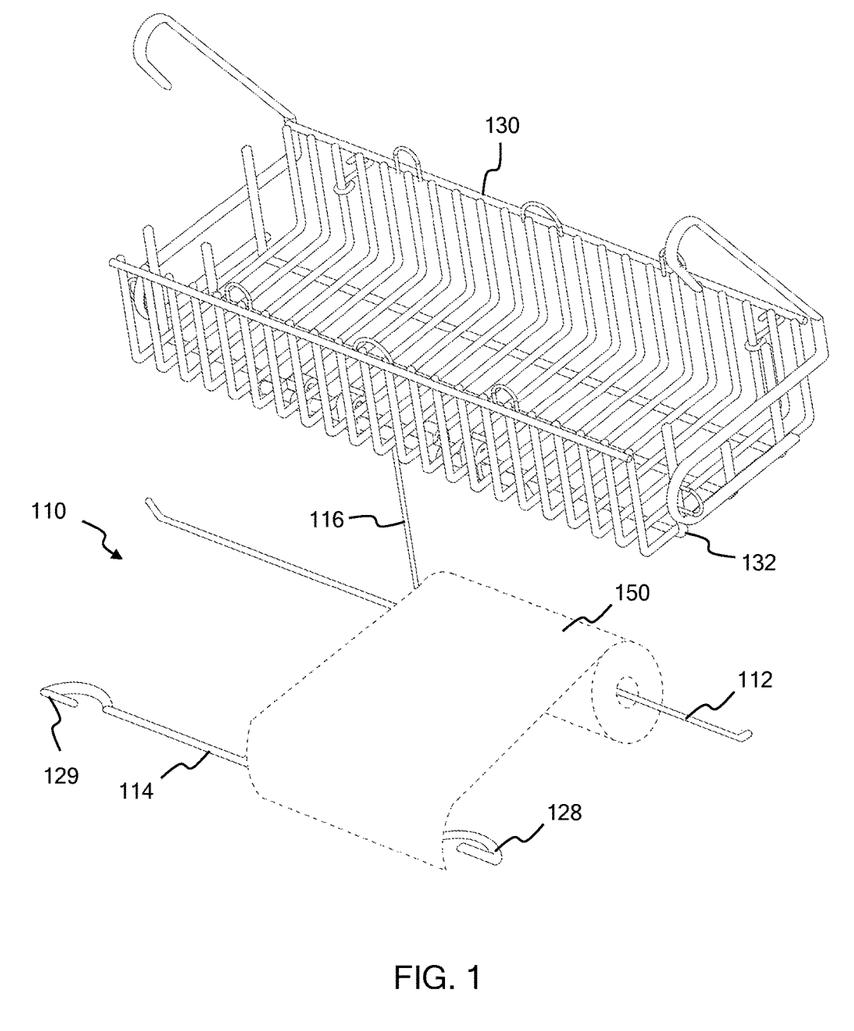
FIG. 1 shows an embodiment of a bag dispenser coupled to a basket and dispensing bags.

FIG. 1 shows an embodiment of a bag dispenser 110. Bag dispenser 110 dispenses bags from a roll of bags 150 as shown in FIG. 1. Bag dispenser 110 is coupled to basket 130 in this embodiment, but it is to be understood that bag dispenser 110 can be coupled to many different types of baskets or other devices carried or used by an employee or a customer in a retail store. Bag dispenser 110, in the embodiment shown, is coupled to a rod 132 of basket 130. Bag dispenser 110 can be coupled to a rod of a shopping cart, a shopping cart basket, or any other fixture with a rod that bag dispenser 110 can couple to. Bag dispenser 110 as shown in FIG. 1 is formed of plastic-coated metal for strength and safety, but it is to be understood that bag dispenser 110 can be formed of any suitable rigid or semi-rigid material such as metal, wood, or plastic, for example, but not by way of limitation. In some embodiments, bag dispenser 110 is formed of recyclable materials. Often basket 130 is carried by an employee performing tasks in a retail store. Bag dispenser 110 holds and dispenses bags from roll 150 for the employee.

Bag dispenser 110 includes a bag holder rod 112, a bag separator 114, and a rod coupler 116. Bag holder rod 112 extends through roll of bags 150 so that roll of bags 150 can rotate to dispense bags. In this embodiment, bag holder rod 112 is the means to hold roll of bags 150. Roll of bags 150 is often a roll of plastic bags such as meat bags, grocery bags, or produce bags, but this is not meant to be limiting. In some embodiments, the means to hold roll of bags 150—bag holder rod 112—holds more than one roll of bags, so that bag dispenser 110 can dispense different type of bags, for example. In the embodiment shown in FIG. 1, bag holder rod 112 can hold two or more rolls of bags 150. A roll of bags 150 can be put on either side of rod coupler 116, in this embodiment. The size and length of bag holder rod 112 can be adjusted so that bag holder rod 112 holds a desired number and size of roll of bags 150.

Bag separator 114 facilitates separation of a bag from roll of bags 150. A first separator hook 128 and a second separator hook 129 are part of bag separator 114, and can be used to separate a bag from roll of bags 150, for example, Or, one of the bags can be pulled down or up against bag separator 114 to facilitate separation of the bag from roll of bags 150 instead of using hooks 128 or 129. Bag holder rod 112 holds roll of bags 150 in close proximity to where an employee is performing tasks, and bag separator 114 makes it easy and efficient for the employee to separate and use one bag at a time from roll of bags 150. In this embodiment, bag separator 114 is a means to separate—or facilitate separation of—a bag from roll of bags 150.

Rod coupler 116 is a means to couple bag holder rod 112 to basket 130. In this embodiment, rod coupler 116 is a means to couple bag holder rod 112 to a basket rod 132 of basket 130. Rod coupler 116 is coupled to bag holder rod 112, and couples bag holder rod 112 to rod 132 of basket 130. It is to be understood that rod coupler 116 can be used to couple bag holder rod 112 of bag dispenser 110 to many different types, sizes, and locations of rods. Rod coupler 116 can couple bag dispenser 110 to many other rods of basket 130, or to rods of other baskets, carts, or other fixtures or devices.

Figure 2:
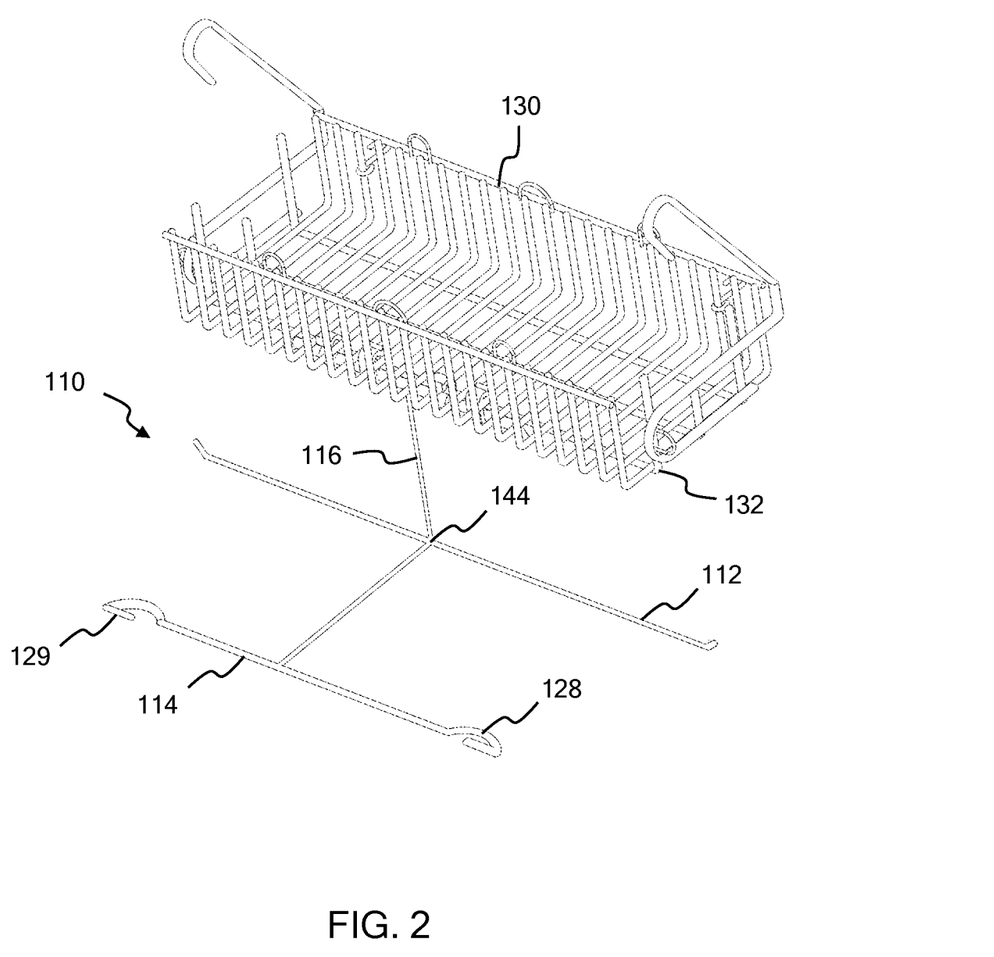
FIG. 2 shows the bag dispenser of FIG. 1 without the roll of bags.
Figure 3:
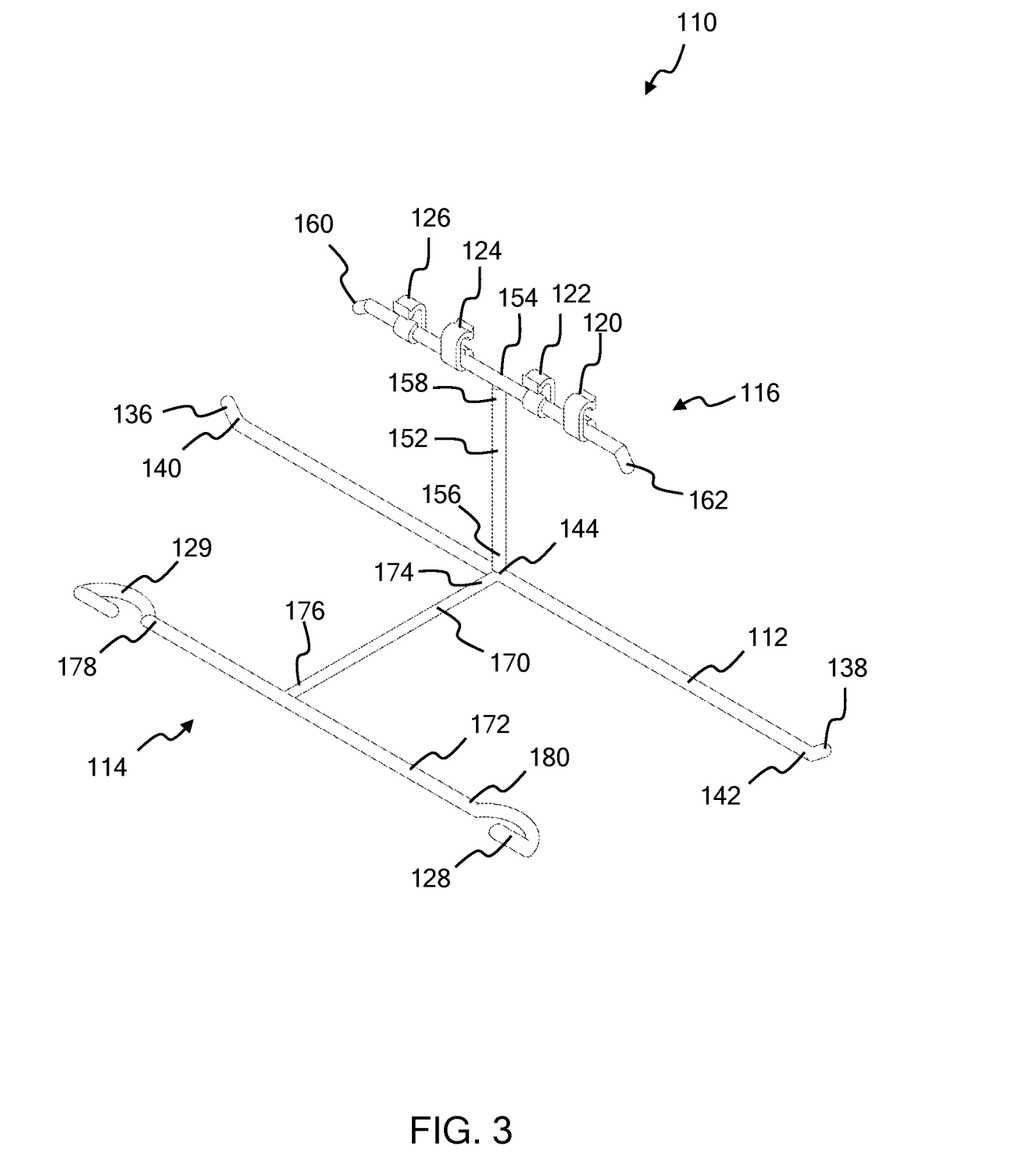
FIG. 3 shows a perspective view of the bag dispenser of FIG. 1.
Figure 4:
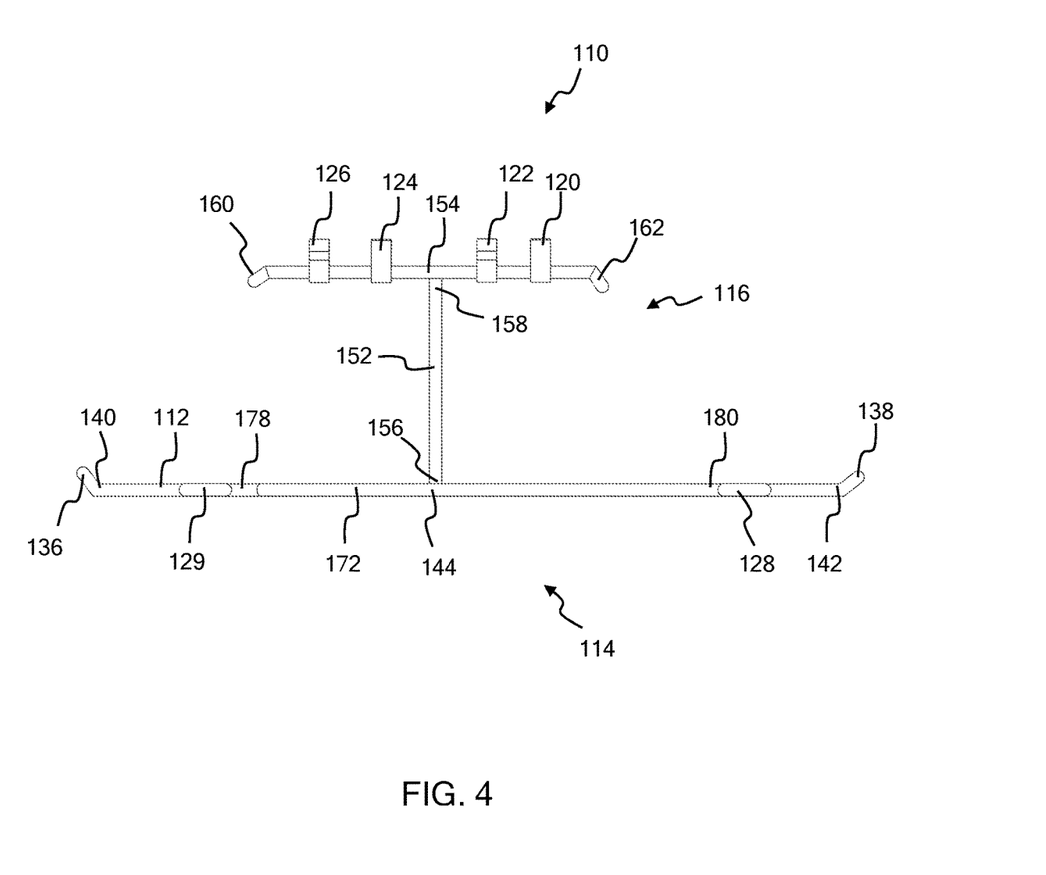
FIG. 4 shows a front view of the bag dispenser of FIG. 1.

FIG. 2 through FIG. 4 show details of bag dispenser 110. FIG. 2 shows bag dispenser 110 coupled to basket 130, with roll of bags 150 removed so details of bag dispenser 110 can be seen. FIG. 3 shows a perspective view of bag dispenser 110. FIG. 4 shows a front view of bag dispenser 110.

Bag holder rod 112, in the embodiment shown in the figures, is an elongate member formed of a rigid or semi-rigid material. An elongate member, as used herein, is an element that has a length much longer than its width. An elongate member, as used herein, can include a rod, a bar, or a wire, for example, but not by way of limitation, formed of metal, wood or plastic, for example. In the embodiments shown, the elongate members used are plastic-coated rigid metal wire or rod, but this is not meant to be limiting. Bag holder rod 112 is formed to be rigid enough to hold one or more roll of bags 150. In some embodiments, bag holder rod 112 is provided with some flexibility for ease of putting rolls of bags 150 onto bag holder rod 112, and so that bag holder rod 112 is safer for an employee to use. Bag holder rod 112 has a bag holder rod first end 136 and a bag holder rod second end 138 opposing bag holder rod first end 136, as shown in FIG. 3 and FIG. 4. In the embodiment of bag dispenser 110 shown in the figures, bag holder rod 112 includes a first bend 140 near bag holder rod first end 136, and a second bend 142 near bag holder rod second end 138. First and second bend 140 and 142 help hold roll of bags 150 on bag holder rod 112, helping to keep roll of bags 150 from sliding off bag holder rod first end 136 or bag holder rod second end 138. First and second bend 140 and 142 can be positioned in many locations on bag holder rod 112, and can be bends of different angles, depending on the size and type of roll of bags 150 to be held on bag holder rod 112. In the embodiment shown, first bend 140 is at bag holder rod first end 136, and second bend 142 is at bag holder rod second end 138, but this is not meant to be limiting. Bag holder rod 112 is straight between first bend 140 and second bend 142 in this embodiment. In some embodiments, bag holder rod 112 has other bends in it.

Bag separator 114 and rod coupler 116 are each coupled to bag holder rod 112 at the same location, at bag holder junction 144, in this embodiment. Bag separator 114 is coupled to bag holder rod 112 at bag holder junction 144, and rod coupler 116 is coupled to bag holder rod 112 at bag holder junction 144, in this embodiment, as shown in FIG. 2, FIG. 3 and FIG. 4. In this embodiment, bag holder junction 144 is between bag holder rod first end 136 and bag holder rod second end 138, as opposed to being at or near bag holder rod first end 136 or bag holder rod second end 138, but this is not meant to be limiting. In some embodiments, bag holder junction 144 is at or near bag holder rod first end 136 or bag holder rod second end, 138. See, for example, bag dispenser 210 described later in this document. In the embodiment shown in FIG. 1 through FIG. 4, bag holder junction 144 is approximately halfway between bag holder rod first end 136 and bag holder rod second end 138. This helps to balance bag dispenser 110, and makes bag dispenser 110 efficient to manufacture. It is to be understood that in some embodiments, bag separator 114 and rod coupler 116 are coupled to bag holder rod 112 at different locations along bag holder rod 112.

Rod coupler 116 couples bag holder rod 112 to basket 130. Rod coupler 116 is T-shaped in this embodiment, but this is not meant to be limiting. Rod coupler 116, in this embodiment, includes a rod coupler stem 152 and a rod coupler clip bar 154. Rod coupler 116 also includes at least one rod clip 120, 122, 124, or 126 coupled to rod coupler clip bar 154.

Rod coupler stem 152 is an elongate member formed of a rigid or semi-rigid material that forms the stem of the T shape. Rod coupler clip bar 154 is an elongate member formed of a rigid or semi-rigid material that forms the crossbar of the T shape and holds the at least one rod clip 120, 122, 124, or 126. In the embodiment shown in FIG. 1 through FIG. 4, rod coupler 116 includes four rod clips, first rod clip 120, second rod clip 122, third rod clip 124, and fourth rod clip 126, see FIG. 3 and FIG. 4. Rod coupler clip bar 154 extends along the bottom of basket 130 in the embodiment shown in FIG. 1 and FIG. 2. Rod clips 120, 122, 124, and 126 each couple to rod 132 by encircling and grasping rod 132, which couples bag dispenser 110 to basket 130. Having rod coupler 116 be T-shaped is advantageous because this provides a crossbar portion that can hold a number rod clips, which couples bag dispenser 110 firmly and securely to basket 130. It is to be understood that this method of coupling bag dispenser 110 to basket 130 is an example only, and many other methods and techniques can be used to couple rod coupler 116 to basket 130.

Rod coupler stem 152 couples rod coupler clip bar 154 to bag holder rod 112. Rod coupler stem 152 has a rod coupler stem first end 156 and a rod coupler stem second end 158 opposing rod coupler stem first end 156. Rod coupler stem first end 156 is coupled to bag holder rod 112. In this embodiment, rod coupler stem first end 156 is coupled to bag holder rod 112 at bag holder junction 144, but this is not meant to be limiting. Rod coupler stem second end 158 is coupled to rod coupler clip bar 154. In this embodiment, rod coupler stem second end 158 is coupled to rod coupler clip bar 154 approximately halfway between the two ends of rod coupler clip bar 154, but this is not meant to be limiting. In this embodiment, rod coupler stem 152 is perpendicular to bag holder rod 112, but this is not meant to be limiting. In some embodiments, rod coupler stem 152 is coupled to bag holder rod 112 at an angle other than 90 degrees.

Rod coupler clip bar 154 holds rod clips 120, 122, 124, and 126. Rod coupler clip bar 154 has a rod coupler clip bar first end 160 and a rod coupler clip bar second end 162. In the embodiment shown in FIG. 1 through FIG. 4, rod coupler stem 152 is coupled to rod coupler clip bar 154 approximately halfway between rod coupler clip bar first end 160 and a rod coupler clip bar second end 162, but this is not meant to be limiting. Rod coupler stem 152 can be coupled to rod coupler clip bar 154 anywhere along the length of rod coupler clip bar 154. Rod coupler clip bar 154 is parallel to bag holder rod 112 in this embodiment, but this is not meant to be limiting. Having rod coupler clip bar 154 be parallel to bag holder rod 112 minimizes the size and extend of bag dispenser 110. In the embodiment shown in the figures, rod coupler clip bar 154 is perpendicular to rod coupler stem 152, but this is not meant to be limiting. In some embodiments, it may be advantageous to have rod coupler clip bar 154 form an angle other than 90 degrees with respect to rod coupler stem 152. Rod clips 120, 122, 124, and 126 are distributed along the length of rod coupler clip bar 154.

Bag separator 114 facilitates separation of a single bag from roll of bags 150. Bag separator 114 is T-shaped, in this embodiment, but this is not meant to be limiting. Bag separator 114 includes a bag separator stem 170, a separator bar 172, and at least one separator hook 128 or 129 coupled to separator bar 172. Bag separator stem 170 forms the stem portion of the T shape, and separator bar 172 forms the crossbar portion of the T shape. In the embodiment shown, bag separator 114 includes a first separator hook 128 and a second separator hook 129.

Bag separator stem 170 is an elongate member formed of a rigid or semi-rigid material with a bag separator stem first end 174 and a bag separator stem second end 176 opposing bag separator stem first end 174. Bag separator stem first end 174 is coupled to bag holder junction 144 of bag holder rod 112, in this embodiment, but this is not meant to be limiting. In some embodiments, bag separator stem first end 174 is coupled to other positions along bag holder rod 112. Bag separator stem second end 176 is coupled to separator bar 172. In this embodiment, bag separator stem 170 is perpendicular to bag holder rod 112, but this is not meant to be limiting. In some embodiments, bag separator stem 170 is coupled to bag holder rod 112 such that bag separator stem 170 forms an angle other than 90 degrees with respect to bag holder rod 112. In the embodiment shown, bag separator stem 170 is perpendicular to rod coupler stem 152, but this is not meant to be limiting.

Separator bar 114 has a separator bar first end 178 and a separator bar second end 180. In this embodiment, first separator hook 128 is coupled to separator bar second end 180, and second separator hook 129 is coupled to separator bar first end 178, but this is not meant to be limiting. First and second separator hooks 128 and 129 are used to hook the roll of bags so that one of the bags can be separated from roll of bags 150. In some embodiments, it is advantageous to have first and/or second separator hooks 128 or 129 at other positions along separator bar 172 other than at the ends. Having bag separator 114 be T-shaped is advantageous because it provides a crossbar portion that can handle a plurality of separator hooks 128 and 129.

In the embodiment show in FIG. 1 through FIG. 4, bag separator stem 170 is coupled to separator bar 172 approximately halfway between bag separator bar first end 178 and bag separator bar second end 180, but this is not meant to be limiting. In some embodiments, bag separator stem 170 is coupled to separator bar 172 at other positions along bag separator bar 172.

In the embodiment shown, separator bar 172 is perpendicular to bag separator stem 170, but this is not meant to be limiting. Angles other than 90 degrees between separator bar 172 and bag separator stem 170 may be advantageous in some configurations of bag dispenser 110. In the embodiment shown, separator bar 172 is perpendicular to bag holder rod 112, but this is not meant to be limiting. Angles other than 90 degrees between separator bar 172 and bag holder rod 112 may be advantageous in some configurations of bag dispenser 110.

In the embodiment shown, separator bar 172 is parallel to bag holder rod 112, but this is not meant to be limiting. Having separator bar 172 be parallel to bag holder rod 112 minimizes the size and complexity of bag dispenser 110. In the embodiment shown, separator bar 172 is also parallel to rod coupler clip bar 154, but this is not meant to be limiting. Having separator bar 172 be parallel to rod coupler clip bar 154 minimizes the size and complexity of bag dispenser 110.

In the embodiment shown, bag separator stem 170 is perpendicular to bag separator bar 172, bag holder rod 112, and rod coupler stem 152.

Once rod coupler 116 is coupled to a rod of basket 130, roll of bags 150 can be installed on bag holder rod 112. An employee using basket 130 now has easy access to roll of bags 150, and can use bag separator 114 to facilitate separation of one or more bags from roll of bags 150. Roll of bags 150 can be easily used to supply bags when the employee needs them. Roll of bags 150 can be any size or type of bags that might be needed for the employee to perform tasks.

Figure 5:
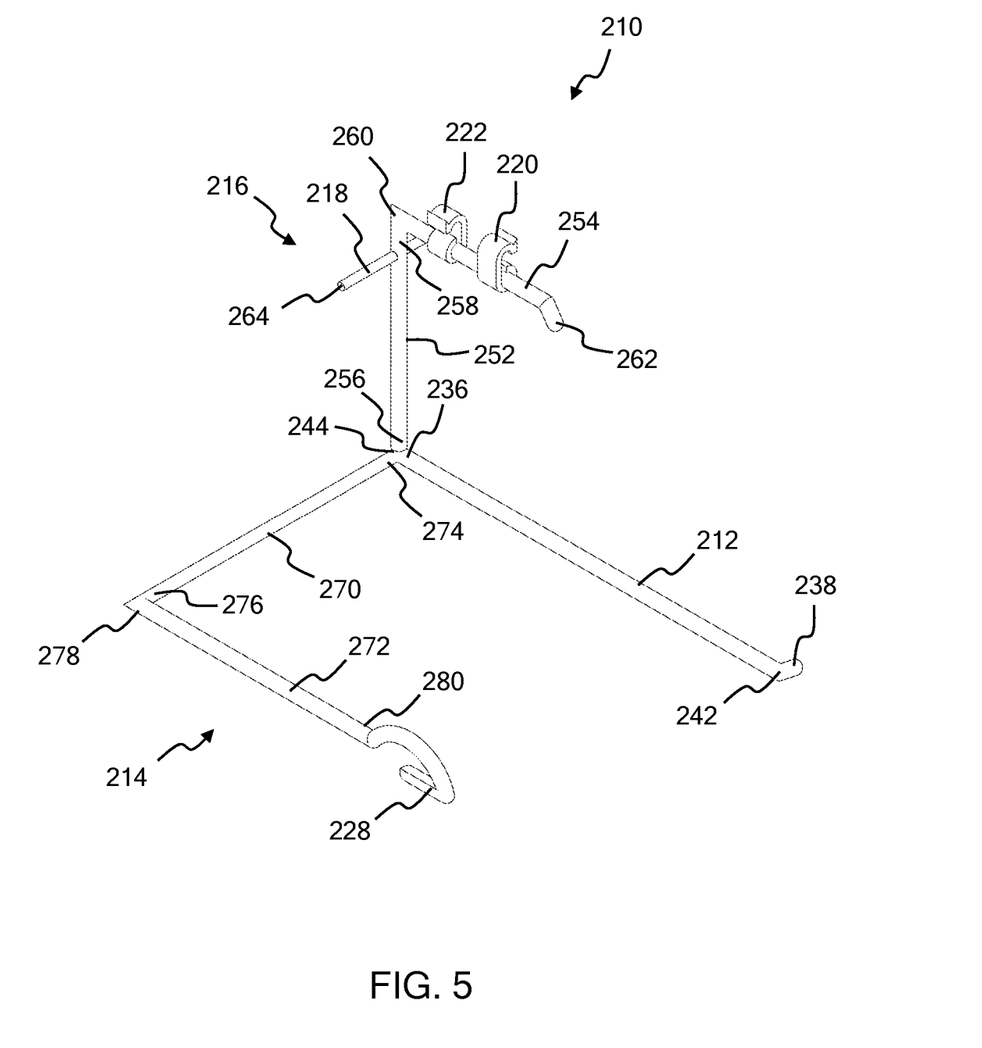
FIG. 5 shows a perspective view of a further embodiment of a bag dispenser.
Figure 6:
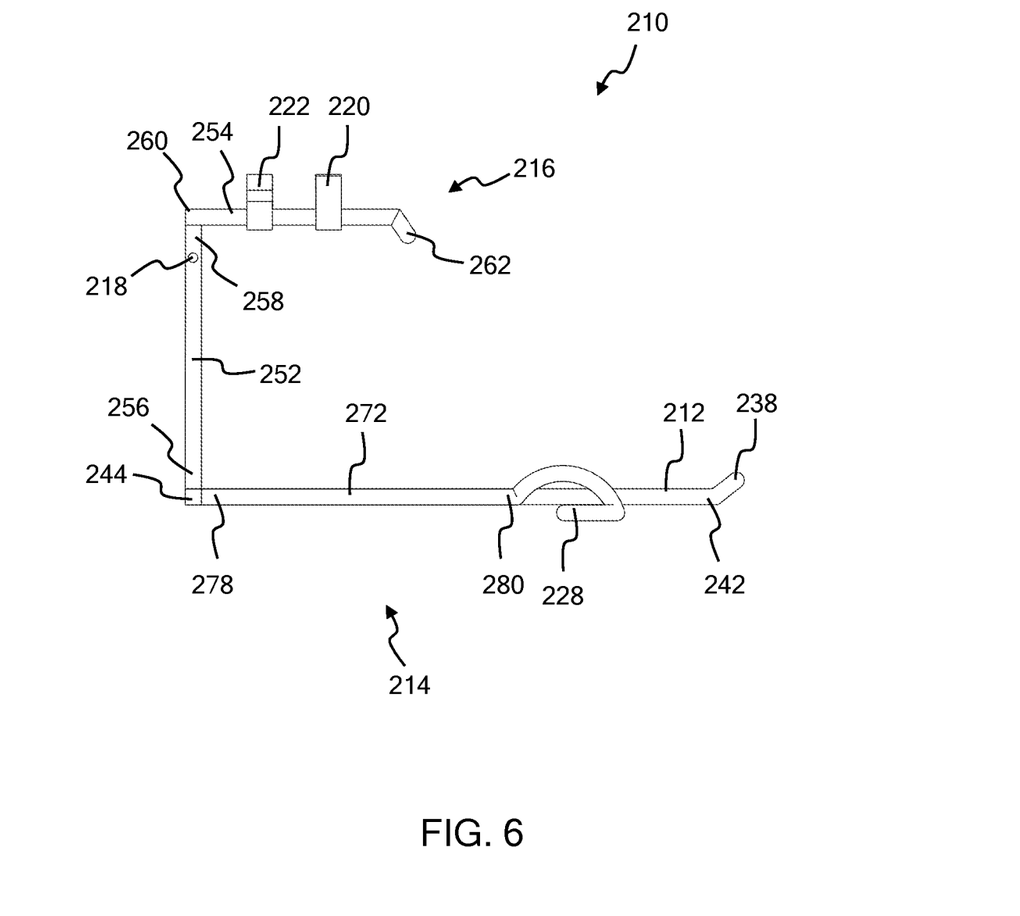
FIG. 6 shows a front view of the bag dispenser of FIG. 5.

FIG. 5 and FIG. 6 show an embodiment of a bag dispenser 210. FIG. 5 shows a perspective view of bag dispenser 210. FIG. 6 shows a front view of bag dispenser 210. Bag dispenser 210 dispenses bags from a roll of bags, similar to what is shown in FIG. 1 with bag dispenser 110. Bag dispenser 210 is similar to bag dispenser 110, but with different forms of a bag separator and a rod coupler. It is to be understood that the bag separator and the rod coupler can take many different forms. Bag dispenser 210 can be coupled to basket 130 similar to bag dispenser 110 shown in FIG. 1 and FIG. 2, or bag dispenser 210 can be coupled to many different types of baskets or other devices carried or used by an employee in a retail store. Bag dispenser 210 can be coupled to a rod of a shopping cart, a shopping cart basket, or any other fixture with a rod that bag dispenser 210 can couple to. Bag dispenser 210 as shown in FIG. 5 and FIG. 6 is formed of plastic-coated metal for strength and safety, but it is to be understood that bag dispenser 210 can be formed of any suitable rigid or semi-rigid material such as metal, wood, or plastic, for example, but not by way of limitation. In some embodiments, bag dispenser 210 is formed of recyclable materials.

Bag dispenser 210 includes a bag holder rod 212, a bag separator 214, and a rod coupler 216. Bag holder rod 212 extends through a roll of bags so that the roll of bags can rotate to dispense bags, similar to bag dispenser 110 shown in FIG. 1. In this embodiment, bag holder rod 212 is the means to hold a roll of bags. The roll of bags held by bag dispenser 210 is often a roll of plastic bags such as meat bags, grocery bags, or produce bags, but this is not meant to be limiting. In some embodiments, the means to hold the roll of bags—bag holder rod 212—holds more than one roll of bags, so that bag dispenser 210 can dispense different type of bags, for example. The size and length of bag holder rod 212 can be adjusted so that bag holder rod 212 holds a desired number and size of rolls of bags.

Bag separator 214 facilitates separation of a bag from the roll of bags. A first separator hook 228 is part of bag separator 214, and can be used to separate a bag from the roll of bags, for example. Or, one of the bags can be pulled down or up against bag separator 214 to facilitate separation of a bag from the roll of bags. Bag holder rod 212 holds the roll of bags in close proximity to where an employee is performing tasks, and bag separator 214 makes it easy and efficient for the employee to separate and use one bag at a time from the roll of bags. In this embodiment, bag separator 214 is a means to separate—or facilitate separation of—a bag from the roll of bags.

Rod coupler 216 is a means to couple bag dispenser 210 and bag holder rod 212 to a basket such as basket 130 shown in FIG. 1. In this embodiment, rod coupler 216 is a means to couple bag holder rod 212 to a rod 132 of basket 130. Rod coupler 216 is coupled to bag holder rod 212, and can be used to couple bag holder rod 212 to rod 132 of basket 130. It is to be understood that rod coupler 216 can be used to couple bag holder rod 212 of bag dispenser 210 to many different types, sizes, and locations of rods. Rod coupler 216 can couple bag dispenser 210 to many other rods of basket 130, or to rods of other baskets, carts, or other fixtures or devices.

Bag holder rod 212, in the embodiment shown in the figures, is an elongate member formed of a rigid or semi-rigid material. Bag holder rod 212 is formed to be rigid enough to hold one or more rolls of bags. In some embodiments, bag holder rod 212 is provided with some flexibility for ease of putting rolls of bags onto bag holder rod 212, and so that bag holder rod 212 is safer for an employee to use. Bag holder rod 212 has a bag holder rod first end 236 and a bag holder rod second end 238, as shown in FIG. 5. In the embodiment of bag dispenser 210 shown in the figures, bag holder rod 212 includes a bend 242 near bag holder rod second end 238. Bend 242 helps hold a roll of bags on bag holder rod 212, helping to keep the roll of bags from sliding off bag holder rod second end 238. Bend 242 can be positioned in many locations on bag holder rod 212, and can be a bend of different angles, depending on the size and type of the roll of bags to be held on bag holder rod 212. In the embodiment shown, bend 242 is at bag holder rod second end 138, but this is not meant to be limiting. Bag holder rod first end 236 is coupled to both bag separator 214 and rod coupler 216 at bag holder junction 244.

Bag separator 214 and rod coupler 216 are each coupled to bag holder rod 212 at the same location, at bag holder junction 244, in this embodiment. Bag separator 214 is coupled to bag holder rod 212 at bag holder junction 244, and rod coupler 216 is coupled to bag holder rod 212 at bag holder junction 244, in this embodiment. In this embodiment, junction 244 is at bag holder rod first end 236, but this is not meant to be limiting. In some embodiments, bag holder junction 144 is in between bag holder rod first end 236 and bag holder rod second end 238. See, for example, bag holder 110 described earlier in this document. It is to be understood that in some embodiments, bag separator 214 and rod coupler 216 are coupled to bag holder rod 212 at different locations along bag holder rod 212.

Rod coupler 216 couples bag holder rod 212 to a rod of a basket. Rod coupler 216 is L-shaped in this embodiment, but this is not meant to be limiting. Having rod coupler 216 be L-shaped is advantageous in that it makes rod coupler 216 and bag dispenser 210 more compact. Rod coupler 216 in this embodiment includes a rod coupler stem 252 and a rod coupler clip bar 254. Rod coupler 216 also includes at least one rod clip coupled to rod coupler clip bar 254. Rod coupler stem 252 is an elongate member that forms the stem of the L shape, and rod coupler clip bar 254 is an elongate member that forms the bottom of the L shape and holds the at least one rod clip. In the embodiment shown in FIG. 5 and FIG. 6, rod coupler 216 includes two rod clips, first rod clip 220, and second rod clip 222. Rod coupler clip bar 254 can extend along the bottom of a basket such as basket 130 of FIG. 1 and FIG. 2. Rod clips 220 and 222 can each couple to rod 232, for example, by encircling and grasping rod 232, which couples bag dispenser 210 to basket 130. It is to be understood that bag dispenser 210 to a rod or a basket in many different ways.

Rod coupler stem 252 couples rod coupler clip bar 254 to bag holder rod 212. Rod coupler stem 252 has a rod coupler stem first end 256 and a rod coupler stem second end 258 opposing rod coupler stem first end 256. Rod coupler stem first end 256 is coupled to bag holder rod 212. In this embodiment, rod coupler stem first end 256 is coupled to bag holder rod 212 at bag holder junction 244, but this is not meant to be limiting. Rod coupler stem second end 258 is coupled to rod coupler clip bar 254. In this embodiment, rod coupler stem 252 is perpendicular to bag holder rod 212, but this is not meant to be limiting. In some embodiments, rod coupler stem 252 is coupled to bag holder rod 212 such that rod coupler stem 252 and bag holder rod 212 form an angle other than 90 degrees.

Rod coupler clip bar 254 holds rod clips 220 and 222. Rod coupler clip bar 254 has a rod coupler clip bar first end 260 and a rod coupler clip bar second end 262 opposing rod coupler clip bar first end 260. In the embodiment shown in FIG. 5 through FIG. 6, rod coupler clip bar first end 260 is coupled to rod coupler stem second end 258, but this is not meant to be limiting. Rod coupler stem second end 258 of rod coupler stem 252 can be coupled to rod coupler clip bar 254 anywhere along the length of rod coupler clip bar 254. In the embodiment shown in the figures, rod coupler clip bar 254 is perpendicular to rod coupler stem 252, but this is not meant to be limiting. In some embodiments, it may be advantageous to have rod coupler clip bar 254 form an angle other than 90 degrees with respect to rod coupler stem 252. Rod clips 220 and 222 are distributed along the length of rod coupler clip bar 254. In the embodiment shown in the figures, rod coupler clip bar 254 is parallel to bag holder rod 212.

Rod coupler clip bar 216, in the embodiment shown in FIG. 5 and FIG. 6, includes a T bar 218. T bar 218 is an elongate member coupled to and extending through rod coupler stem 252. T bar 218 has a first end 264 and a second end (not shown) as shown in FIG. 5. T bar 218 extends through rod coupler stem 252 such that rod coupler stem 252 approximately bisects T bar 216. T bar 216 helps to stabilize bag dispenser 210 against a basket, so that bag dispenser 210 does not wobble. T bar 218 in this embodiment is coupled to rod coupler stem 252 near rod coupler stem second end 258, but other positions are envisioned according to specific designs.

Bag separator 214 facilitates separation of a bag from the roll of bag on bag holder rod 212. Bag separator 214 is L-shaped, in this embodiment, but this is not meant to be limiting. Having bag separator 214 be L-shaped is advantageous in that it makes bag separator 214 and bag dispenser 210 more compact. Bag separator 214 includes a bag separator stem 270, a separator bar 272, and at least one separator hook 228 coupled to separator bar 272. Bag separator stem 270 forms the stem portion of the L shape, and separator bar 272 forms the bottom extension portion of the L shape. In the embodiment shown, bag separator 214 includes one separator hook 228.

Bag separator stem 270 is an elongate member with a bag separator stem first end 274 and a bag separator stem second end 276 opposing bag separator stem first end 274. Bag separator stem first end 274 is coupled to bag holder junction 244 of bag holder rod 212, in this embodiment, but this is not meant to be limiting. In some embodiments, bag separator stem first end 274 is coupled to other positions along bag holder rod 212. Bag separator stem second end 276 is coupled to separator bar 272. In this embodiment, bag separator stem 270 is perpendicular to bag holder rod 212, to separator bar 272, and to rod coupler stem 252, but this is not meant to be limiting. In some embodiments, bag separator stem 270 is coupled to bag holder rod 212 such that bag separator stem 270 forms an angle other than 90 degrees with respect to bag holder rod 212.

Separator bar 214 includes a separator bar first end 278 and a separator bar second end 280. In this embodiment, separator hook 228 is coupled to separator bar second end 280, but this is not meant to be limiting. Separator hook 228 is used to hook the roll of bags so that one of the bags can be separated from the roll of bags, for example. In some embodiments, it is advantageous to have separator hook 228 at other positions along separator bar 272 other than at separator bar second end 280, or to have more separator hooks coupled to separator bar 272.

In the embodiment show in FIG. 5 and FIG. 6, bag separator stem second end 276 of bag separator stem 270 is coupled to separator bar 272 at separator bar first end 278, but this is not meant to be limiting. In some embodiments, bag separator stem 270 is coupled to separator bar 272 at other positions along bag separator bar 272.

In the embodiment shown, separator bar 272 is perpendicular to bag separator stem 270, but this is not meant to be limiting. Angles other than 90 degrees between separator bar 272 and bag separator stem 270 may be advantageous in some configurations of bag dispenser 210. In the embodiment shown, separator bar 272 is parallel to bag holder rod 212 and rod coupler clip bar 254.

Once rod coupler 216 is coupled to a rod of a basket, a roll of bags can be installed on bag holder rod 212. An employee using the basket now has easy access to the roll of bags, and can use bag separator 214 to facilitate separation of one or more bags from the roll of bags. The roll of bags can be easily used to supply bags when the employee needs them. The roll of bags can be any size or type of bags that might be needed for the employee to perform tasks.

Figure 7:
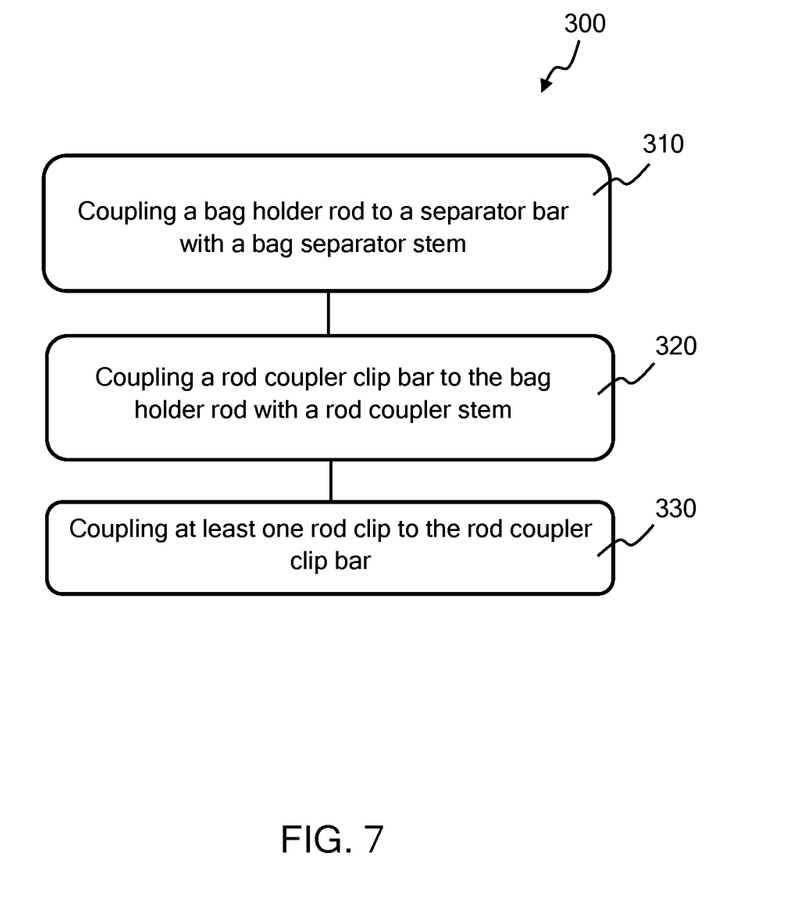
FIG. 7 illustrates a method of assembling a bag dispenser.

FIG. 7 illustrates a method 300 of assembling a bag dispenser. Method 300 includes an act 310 of coupling a bag holder rod to a separator bar with a bag separator stem. The bag holder rod is a first elongate member formed of a rigid material having a bag holder rod first end and a bag holder rod second end opposing the bag holder rod first end. The separator bar is a second elongate member having a separator bar first end and a separator bar second opposing the separator bar first end. The separator bar is parallel to the bag holder rod. The bag separator stem is a third elongate member having a bag separator stem first end coupled to the bag holder rod at a bag holder junction, and a bag separator stem second end coupled to the separator bar.

Method 300 also includes an act 320 of coupling a rod coupler clip bar to the bag holder rod with a rod coupler stem. The rod coupler clip bar is a fourth elongate member having a rod coupler clip bar first end and a rod coupler clip bar second end opposing the rod coupler clip bar first end. The rod coupler clip bar is parallel to the separator bar and the bag holder rod. The rod coupler stem is a fifth elongate member having a rod coupler stem first end coupled to the bag holder rod at the bag holder junction and a bag holder stem second end coupled to the rod coupler clip bar.

Method 300 also includes an act 330 of coupling at least one rod clip to the rod coupler clip bar, wherein the at least one rod clip is configured to couple the bag dispenser to a basket.

Method 300 can include many other steps. In some embodiments, method 300 includes coupling a first separator hook to the separator bar first end. In some embodiments, method 300 includes coupling a second separator hook to the separator bar second end.

In some embodiments, the bag separator stem is perpendicular to the separator bar and the bag holder rod. In some embodiments, the rod coupler stem is perpendicular to the bag separator stem. In some embodiments, the rod coupler stem is perpendicular to the bag holder rod.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A bag dispenser comprising:
a bag holder rod, wherein the bag holder rod holds a roll of bags, and wherein the bag holder rod comprises a first elongate member formed of a rigid material having a bag holder rod first end and a bag holder rod second end opposing the bag holder rod first end;
a bag separator coupled to the bag holder rod, wherein the bag separator comprises:
a separator bar, wherein the separator bar comprises a second elongate member having a separator bar first end and a separator bar second end opposing the separator bar first end, and wherein the bag holder rod is parallel to the separator bar:
a bag separator stem coupling the bag holder rod to the separator bar, wherein the bag separator stem comprises a third elongate member having a bag separator stem first end coupled to the bag holder rod at a bag holder junction, and a bag separator stem second end coupled to the separator bar, and wherein the bag separator stem is perpendicular to the bag holder rod and to the separator bar; and
a separator hook coupled to the separator bar second end; and
a rod coupler coupled to the bag holder rod at the bag holder junction, wherein the rod coupler is configured to couple the bag dispenser to a basket, and wherein the rod coupler comprises:
a rod coupler clip bar, wherein the rod coupler clip bar comprises a fourth elongate member having a rod coupler clip bar first end and a rod coupler clip bar second end opposing the rod coupler clip bar first end, and wherein the rod coupler clip bar is parallel to the bag holder rod;

a rod coupler stem coupling the rod coupler clip bar to the bag holder rod, wherein the rod coupler stem comprises a fifth elongate member having a rod coupler stem first end coupled to the bag holder rod at the bag holder junction and a rod coupler stem second end coupled to the rod coupler clip bar, and wherein the rod coupler stem is coupled to the rod coupler clip bar centered between the rod coupler clip bar first end and the rod coupler clip bar second end; and a rod clip coupled to the rod coupler clip bar, wherein the rod clip is configured to couple the bag dispenser to the basket.

2. The bag dispenser of claim 1, wherein the bag holder junction is centered between the bag holder rod first end and the bag holder rod second end.

3. The bag dispenser of claim 2, wherein the bag separator stem is coupled to the separator bar centered between the separator bar first end and the separator bar second end.

4. The bag dispenser of claim 1, wherein the rod coupler stem is perpendicular to the rod coupler clip bar and to the bag holder rod.

5. The bag dispenser of claim 4, wherein the rod coupler stem is perpendicular to the bag separator stem.

6. A bag dispenser comprising:

a bag holder rod, wherein the bag holder rod holds a roll of bags, and wherein the bag holder rod comprises a first elongate member formed of a rigid material having a bag holder rod first end and a bag holder rod second end opposing the bag holder rod first end;

a separator bar, wherein the separator bar comprises a second elongate member having a separator bar first end and a separator bar second end opposing the separator bar first end, and wherein the separator bar is parallel to the bag holder rod;

a first separator hook coupled to the separator bar first end, and a second separator hook coupled to the separator bar second end;

a bag separator stem coupling the bag holder rod to the separator bar, wherein the bag separator stem comprises a third elongate member having a bag separator stem first end coupled to the bag holder rod at a bag holder junction, and a bag separator stem second end coupled to the separator bar, and wherein the bag separator stem is perpendicular to both the separator bar and the bag holder rod;

a rod coupler clip bar, wherein the rod coupler clip bar comprises a fourth elongate member having a rod coupler clip bar first end and a rod coupler clip bar second end, and wherein the rod coupler clip bar is parallel to the separator bar and the bag holder rod;

a rod coupler stem coupling the rod coupler clip bar to the bag holder rod, wherein the rod coupler stem comprises a fifth elongate member having a rod coupler stem first end coupled to the bag holder rod at the bag holder junction and a rod coupler stem second end coupled to the rod coupler clip bar centered between the rod coupler clip bar first end and the rod coupler clip bar second end; and at least one rod clip coupled to the rod coupler clip bar, wherein the at least one rod clip is configured to couple the bag dispenser to a rod of a basket.

7. The bag dispenser of claim 6, wherein the bag separator stem is perpendicular to the rod coupler stem.

* * * * *